US011611963B2

(12) United States Patent
Tang et al.

(10) Patent No.: US 11,611,963 B2
(45) Date of Patent: *Mar. 21, 2023

(54) CHANNEL LOCATION INDICATION METHOD, AND RELATED PRODUCT

(71) Applicant: GUANGDONG OPPO MOBILE TELECOMMUNICATIONS CORP., LTD., Guangdong (CN)

(72) Inventors: Hai Tang, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/481,731

(22) Filed: Sep. 22, 2021

(65) Prior Publication Data
US 2022/0007368 A1 Jan. 6, 2022

Related U.S. Application Data

(63) Continuation of application No. 16/602,532, filed as application No. PCT/CN2017/082515 on Apr. 28, 2017, now Pat. No. 11,147,068.

(51) Int. Cl.
H04W 72/04 (2009.01)
H04W 72/0453 (2023.01)
H04W 72/0446 (2023.01)

(52) U.S. Cl.
CPC ..... *H04W 72/0453* (2013.01); *H04W 72/042* (2013.01); *H04W 72/0446* (2013.01)

(58) Field of Classification Search
CPC .......... H04W 72/0453; H04W 72/042; H04W 72/0446; H04W 72/1289
See application file for complete search history.

(56) References Cited

U.S. PATENT DOCUMENTS

2014/0369293 A1* 12/2014 Guo .................... H04W 72/082
370/329
2015/0208200 A1* 7/2015 Li ..................... H04W 72/0413
370/328
2018/0368122 A1* 12/2018 Kuchibhotla ......... H04L 5/0007

FOREIGN PATENT DOCUMENTS

WO 2016163942 A1 10/2016

OTHER PUBLICATIONS

First Office Action of the Indonesian application No. P00201910994, dated Apr. 13, 2022.

(Continued)

*Primary Examiner* — Huy C Ho
(74) *Attorney, Agent, or Firm* — Ladas & Parry LLP

(57) ABSTRACT

The embodiments provide a channel location indication method and a related product, including that: a network side device sends at least one piece of indication information, the at least one piece of indication information being configured to indicate a location offset between a data channel and a first control channel or between a second control channel and the first control channel, the location offset including a time-domain location offset and/or a frequency-domain location offset and the time-domain location offset being a symbol-level offset. The embodiments are favorable for improving flexibility and efficiency of channel resource allocation in a wireless communication system.

16 Claims, 14 Drawing Sheets

(56) References Cited

OTHER PUBLICATIONS

Fourth Office Action of the European application No. 17907307.7, dated May 16, 2022.
Third Office Acton of the European application No. 17907307.7, dated Nov. 10, 2021.
Second Office Action of the Canadian application No. 3063345, dated Nov. 10, 2021.
First Office Action of the Israeli application No. 270211, dated Jan. 9, 2022.
Office Action of the Australian application No. 2017411586, dated Mar. 18, 2022.
Third Office Action of the Canadian application No. 3083345, dated Nov. 23, 2022.
First Office Action of the Mexican application No. MX/a/2019/012874, dated Nov. 30, 2022.

\* cited by examiner

CHANNEL LOCATION INDICATION METHOD, AND RELATED PRODUCT

CROSS-REFERENCE TO RELATED APPLICATION

This is a continuation application of U.S. patent application Ser. No. 16/602,532 which is a U.S. national stage of International Patent Application No. PCT/CN2017/082515 filed on Apr. 28, 2017, the contents of which are incorporated herein by reference in their entirety.

TECHNICAL FIELD

The disclosure relates to the technical field of communication, and more particularly to a channel location indication method and a related product.

BACKGROUND

5th-Generation (5G) New Radio (NR) is a subject raised recently by the 3rd Generation Partnership Project (3GPP). Along with increasingly deep discussions about a 5G technology, on one hand, because of backward compatibility of a communication system, a new technology researched and developed later tends to be compatible with a technology which has been standardized before; and on the other hand, because of existence of numerous existing designs for 4th Generation mobile communication (4G) Long Term Evolution (LTE), flexibility of 5G may inevitably be sacrificed for compatibility to further bring reduction in performance. Therefore, researches in two directions are concurrently made by the 3GPP at present. Here, the technical discussion group not considering backward compatibility is called 5G NR.

In an LTE system, a time-domain location of a data channel (for example, a Physical Downlink Shared Channel (PDSCH)) takes a slot and a subframe as a unit. A starting location of the PDSCH is for a slot/subframe where the PDSCH is located, and a serial number of a symbol where the PDSCH starts in the subframe is indicated in a Physical Control Format Indicator Channel (PCFICH) of the subframe. In addition, in the LTE system, a time-domain location of a control channel is also defined by taking a slot/subframe as a unit, a Physical Downlink Control Channel (PDCCH) is always at a starting location of the subframe, and a Physical Uplink Control Channel (PUCCH) occupies the whole slot/subframe.

In a 5G NR system, for improving the flexibility of data transmission resource allocation and reducing a delay, flexibility of a time-domain location of a channel is greatly improved, and a symbol may be taken as a unit for allocation. All of a PDSCH, a PDCCH, a Physical Uplink Shared Channel (PUSCH) and a PUCCH may start from any symbol and take any symbol number as a length, and it is quite difficult to configure time-domain locations of a data channel and a control channel by taking a slot/subframe boundary as a reference point. A conventional manner of indicating starting locations of a data channel and a control channel through symbol serial numbers in a slot may greatly limit the flexibility of resource allocation.

SUMMARY

Embodiments of the disclosure provide a channel location indication method and a related product, to improve flexibility and efficiency of data channel resource allocation in a wireless communication system.

According to a first aspect, the embodiments of the disclosure provide a data transmission method, which may include the following operations.

A network-side device sends indication information, the indication information being configured to indicate an offset of a frequency-domain resource of a data channel relative to a frequency-domain starting location of a resource set of a first control channel or a frequency-domain starting location of a search space of the first control channel, and the first control channel is a channel for scheduling the data channel.

According to a second aspect, the embodiments of the disclosure provide a data transmission method, which may include the following operations.

A terminal receives indication information, the indication information being configured to indicate an offset of a frequency-domain resource of a data channel relative to a frequency-domain starting location of a resource set of a first control channel or a frequency-domain starting location of a search space of the first control channel, and the first control channel is a channel for scheduling the data channel.

According to a third aspect, the embodiments of the disclosure provide a network-side device, which has a function of implementing an operation of a network device in the method design. The function may be realized through hardware and may also be realized by executing corresponding software through the hardware. The hardware or the software includes one or more modules corresponding to the function.

In a possible design, the network-side device includes a processor, and the processor is configured to support the network-side device to realize a corresponding function in the method. Furthermore, the network-side device may further include a transceiver, and the transceiver is configured to support communication between the network-side device and the terminal. Furthermore, the network-side device may further include a memory, and the memory is configured to be coupled to the processor and store a necessary program instruction and data of the network-side device.

According to a fourth aspect, the embodiments of the disclosure provide a terminal, which has a function of implementing an operation of a terminal in the method design. The function may be realized through hardware and may also be realized by executing corresponding software through the hardware. The hardware or the software may include one or more modules corresponding to the function.

In a possible design, the terminal includes a processor, and the processor is configured to support the terminal to realize a corresponding function in the method. Furthermore, the terminal may further include a communication interface, and the communication interface is configured to support communication between the terminal and a network-side device. Furthermore, the network-side device may further include a memory, and the memory is configured to be coupled to the processor, and stores a necessary program instruction and data of the terminal.

According to a fifth aspect, the embodiments of the disclosure provide a network-side device, which may include one or more processors, a memory, a transceiver and one or more programs. The one or more programs may be stored in the memory and configured to be executed by the one or more processors, and the programs may include instructions configured to execute the steps in any method according to the first aspect of the embodiments of the disclosure.

According to a sixth aspect, the embodiments of the disclosure provide a terminal, which may include one or more processors, a memory, a communication interface and one or more programs. The one or more programs may be stored in the memory and configured to be executed by the one or more processors, and the programs may include instructions configured to execute the steps in any method according to the second aspect of the embodiments of the disclosure.

According to a seventh aspect, the embodiments of the disclosure provide a non-transitory computer-readable storage medium, which may store a computer program configured for electronic data exchange, the computer program enabling a computer to execute part or all of the steps described in any method according to the first aspect of the embodiments of the disclosure.

According to an eighth aspect, the embodiments of the disclosure provide a non-transitory computer-readable storage medium, which may store a computer program configured for electronic data exchange, the computer program enabling a computer to execute part or all of the steps described in any method according to the second aspect of the embodiments of the disclosure.

BRIEF DESCRIPTION OF DRAWINGS

The drawings required to be used for descriptions about the embodiments or a conventional art will be simply introduced below.

DETAILED DESCRIPTION

The technical solutions in the embodiments of the disclosure will be described below in combination with the drawings.

Figure 1:
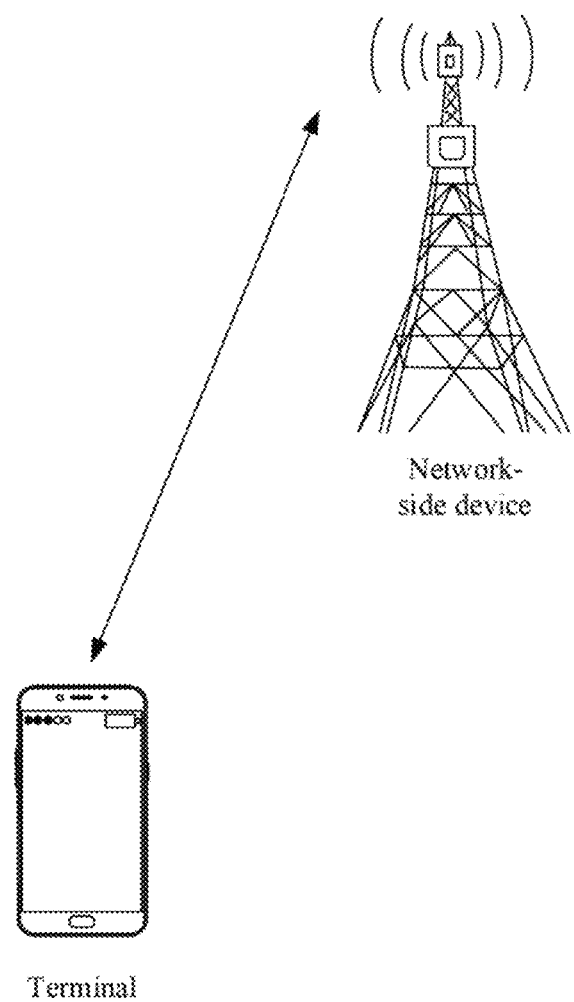
FIG. 1 is a network architecture diagram of an exemplary communication system according to an embodiment of the disclosure.

Referring to FIG. 1, FIG. 1 is a possible network architecture of an exemplary communication system according to an embodiment of the disclosure. The exemplary communication system may be a 4G LTE communication system or a 5G NR communication system, and may specifically include a network-side device and a terminal. When the terminal accesses a mobile communication network provided by the network-side device, the terminal forms a communication connection connected with the network-side device through a wireless link. Such a communication connection may be a single-connection or a dual-connection or a multi-connection. When the communication connection is the single-connection, the network-side device may be an LTE base station or an NR base station (also called a gNB). When the communication is the dual-connection (which may specifically be implemented by a Carrier Aggregation (CA) technology or by multiple network-side devices) and when the terminal is connected with the multiple network-side devices, the multiple network-side devices include a Master Cell Group (MCG) and Secondary Cell Groups (SCGs), data is transmitted back between the cell groups through backhauls, the MCG may be an LTE base station and the SCGs may be LTE base stations, or, the MCG may be an NR base station and the SCGs may be LTE base stations, or, the MCG may be an NR base station and the SCGs may be NR base stations.

In the embodiments of the disclosure, terms "network" and "system" are often used alternately and their meanings may be understood by those skilled in the art. A terminal involved in the embodiments of the disclosure may include various handheld devices, vehicle-mounted devices, wearable devices, computing devices or other processing devices connected to wireless modems, which have a wireless communication function, as well as User Equipment (UE), Mobile Stations (MSs), terminal devices and the like in various forms. For convenient description, the devices mentioned above are collectively referred to as terminals.

Figure 2A:
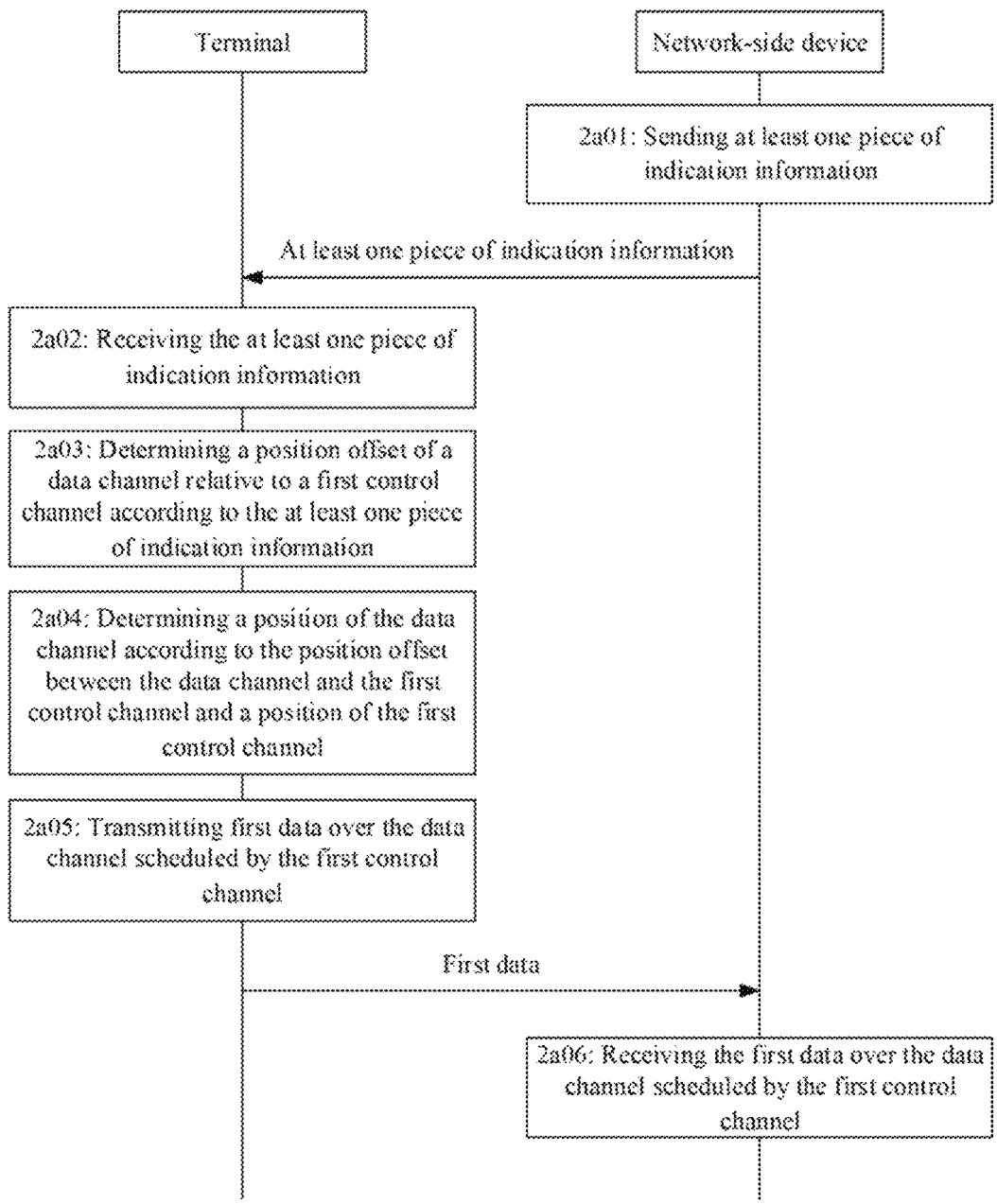
FIG. 2A is a schematic communication diagram of a channel location indication method according to an embodiment of the disclosure.

Referring to FIG. 2A, FIG. 2A illustrates a channel location indication method according to an embodiment of the disclosure. The method includes an operation 201, specifically as follows.

In an operation 2a01, a network-side device sends at least one piece of indication information, the at least one piece of indication information being configured to indicate a location offset between a data channel and a first control channel, the location offset including a time-domain location offset and/or a frequency-domain location offset and the location offset being a symbol-level offset.

The first control channel is a channel for scheduling the data channel.

The time-domain location offset is an offset of a time-domain starting location and/or time-domain ending location of a time-domain resource of the data channel relative to a time-domain starting location and/or time-domain ending location of a time-domain resource of the first control channel; or, the time-domain location offset is an offset of a time-domain starting location and/or ending location of a time-frequency resource of the data channel relative to a time-domain starting location and/or time-domain ending location of a preset time-frequency resource, the preset time-frequency resource including a resource set or search space of the first control channel.

The frequency-domain location offset is an offset of a frequency-domain starting location and/or frequency-domain ending location of a frequency-domain resource of the data channel relative to a frequency-domain starting location and/or frequency-domain ending location of a frequency-domain resource of the first control channel.

A unit of the time-domain location offset may be a symbol-level unit, for example, 1 symbol, 2 symbols or more symbols. On such a basis, a unit of the time-domain location offset may also be a combination of a symbol and a slot, a combination of a symbol and a mini-slot, and the like. A unit of the frequency-domain location offset may be any one of: a resource block and a preset number of resource blocks.

In an operation 2a02, a terminal receives the at least one piece of indication information, the at least one piece of indication information being configured to indicate the location offset between the data channel and the first control channel, the location offset including the time-domain location offset and/or the frequency-domain location offset and the location offset being a symbol-level offset.

In an operation 2a03, the terminal determines the location offset of the data channel relative to the first control channel according to the at least one piece of indication information.

In an operation 2a04, the terminal determines a location of the data channel scheduled by the first control channel according to the location offset of the data channel relative to the first control channel and a location of the first control channel.

The location of the data channel may be a location of the time-frequency resource of the data channel.

In an operation 2a05, the terminal transmits first data over the data channel scheduled by the control channel.

In an operation 2a06, the network-side device receives first data over the data channel scheduled by the control channel.

It can be seen that, in the embodiment of the disclosure, at least one piece of indication information is transmitted between a network-side device and a terminal, the at least one piece of indication information being configured to indicate the location offset between a data channel and a first control channel. The location offset includes a time-domain location offset and/or a frequency-domain location offset and the time-domain location offset is a symbol-level offset, therefore, the time-frequency resource of the data channel may be conveniently determined according to the location offset in regardless of the symbol where the first control channel is located, namely, a starting location of the resource of the data channel is not requited to be indicated by a fixed subframe/slot boundary, like in an LTE system. Thus, relatively high signaling complexity and overhead brought by two-level indication of "indicating a subframe/slot where the channel is located and then indicating a symbol where the channel starts in the subframe/slot" are avoided, and improvement in flexibility and efficiency of data channel resource allocation in a wireless communication system is facilitated.

Figure 2B:
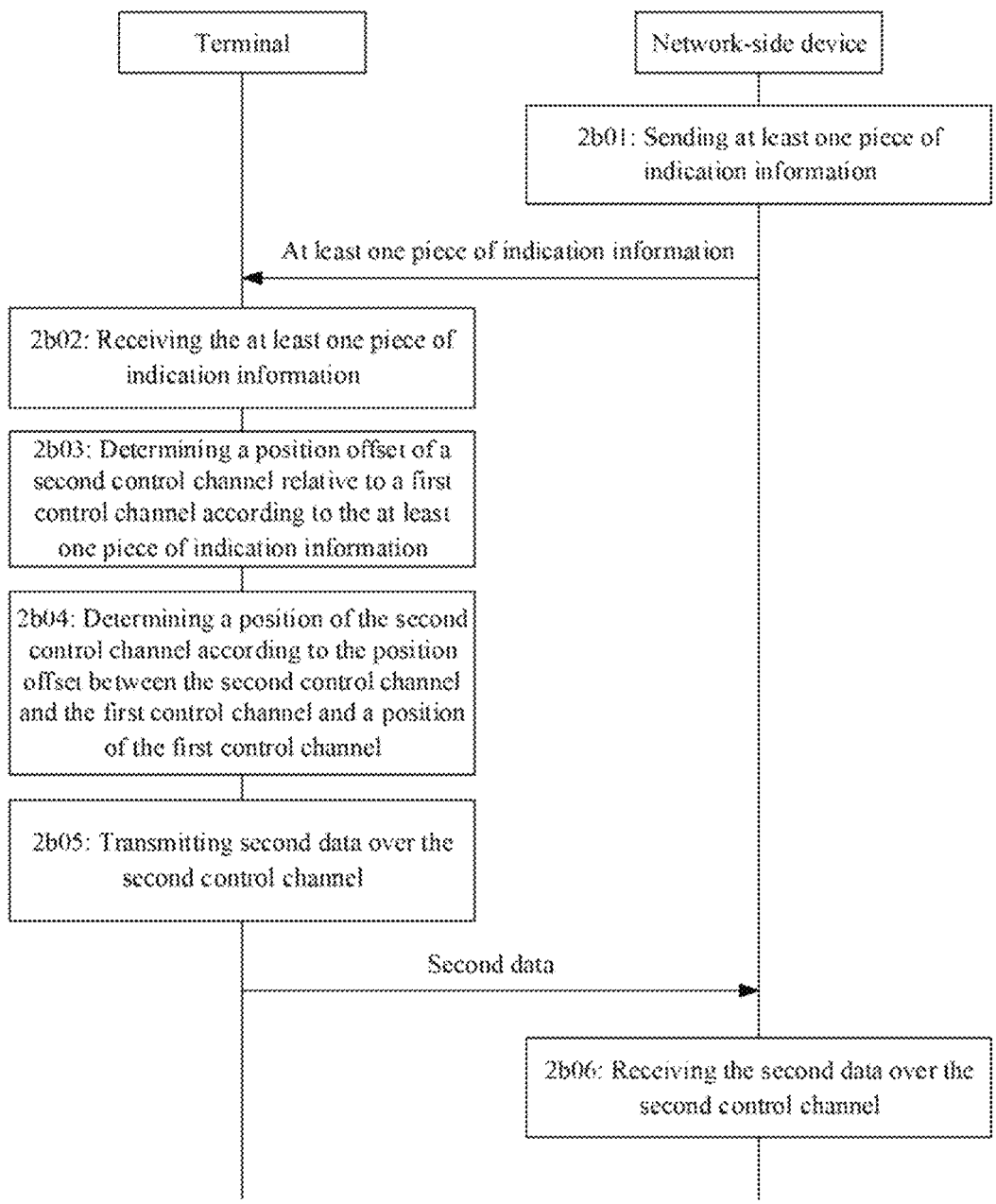
FIG. 2B is a schematic communication diagram of another channel location indication method according to an embodiment of the disclosure.

Similar to FIG. 2A, referring to FIG. 2B, FIG. 2B illustrates a channel location indication method according to an embodiment of the disclosure. The method includes an operation 2b01, specifically as follows.

In the operation 2b01, a network-side device sends at least one piece of indication information, the at least one piece of indication information being configured to indicate a location offset between a second control channel and a first control channel, the location offset including a time-domain location offset and/or a frequency-domain location offset and the location offset being a symbol-level offset.

The first control channel is a channel for scheduling a data channel.

The time-domain location offset is an offset of a time-domain starting location and/or time-domain ending location of a time-domain resource of the second control channel relative to a time-domain starting location and/or time-domain ending location of a time-domain resource of the first control channel; or, the time-domain location offset is an offset of a time-domain starting location and/or ending location of a time-frequency resource of the second control channel relative to a time-domain starting location and/or time-domain ending location of a preset time-frequency resource, the preset time-frequency resource including a resource set or search space of the first control channel.

The frequency-domain location offset is an offset of a frequency-domain starting location and/or frequency-domain ending location of a frequency-domain resource of the second control channel relative to a frequency-domain starting location and/or frequency-domain ending location of a frequency-domain resource of the first control channel.

In an operation 2b02, a terminal receives the at least one piece of indication information, the at least one piece of indication information being configured to indicate the location offset between the second control channel and the first control channel, the location offset including the time-domain location offset and/or the frequency-domain location offset and the location offset being a symbol-level offset.

In an operation 2b03, the terminal determines the location offset of the second control channel relative to the first control channel according to the at least one piece of indication information.

In an operation 2b04, the terminal determines a location of the second control channel according to the location offset of the second control channel relative to the first control channel and a location of the first control channel.

The location of the second control channel may be a location of the time-frequency resource of the second control channel.

In an operation 2b05, the terminal transmits second data over the second control channel.

In 2b06, the network-side device receives the second data over the second control channel.

It can be seen that, in the embodiment of the disclosure, at least one piece of indication information is transmitted between a network-side device and a terminal, the at least one piece of indication information being configured to indicate the location offset between the second control channel and the first control channel. Since the location offset includes a time-domain location offset and/or a frequency-domain location offset and the time-domain location offset is a symbol-level offset, the time-frequency resource of the second control channel may be conveniently determined according to the location offset in regardless of the symbol where the first control channel is located, namely, a starting location of the resource of the second control channel is not required to be indicated by a fixed subframe/slot boundary, like in an LTE system. Thus, relatively high signaling complexity and overhead brought by two-level indication of "indicating a subframe/slot where the channel is located and then indicating a symbol where the channel starts in the subframe/slot" are avoided, and improvement in flexibility and efficiency of control channel resource allocation in a wireless communication system is facilitated.

In a possible example, the at least one piece of indication information includes first indication information, and the first indication information is transmitted through RRC signaling or system information; and the first indication information is configured to indicate the location offset between the data channel and the first control channel or between the second control channel and the first control channel.

It can be seen that, in the example, the first indication information is transmitted between the network-side device and the terminal, and the first indication information may directly indicate the location offset between the data channel and the first control channel or between the second control channel and the first control channel, so that a resource location of the channel may be determined according to the location offset, and a resource location of the first control channel, namely the starting location of the resource of the channel, is not required to be indicated by the fixed subframe/slot boundary, like in an LTE system. Thus, relatively high signaling complexity and overhead brought by two-level indication of "indicating the subframe/slot where the channel is located and then indicating the symbol where the channel starts in the subframe/slot" are avoided, and improvement in the flexibility and efficiency of channel resource allocation in a wireless communication system is facilitated. Since the first indication information is transmitted through RRC signaling or system information, a signaling overhead is relatively low, data transmission efficiency of channel resource allocation is further improved, and a signaling reading delay is reduced.

In a possible example, the at least one piece of indication information includes second indication information, and the second indication information is transmitted through downlink control information (DCI); and the second indication information is configured to indicate the location offset between the data channel and the first control channel or between the second control channel and the first control channel.

It can be seen that, in the example, the second indication information is transmitted between the network-side device and the terminal, and the second indication information may directly indicate the location offset between the data channel and the first control channel or between the second control channel and the first control channel, so that the resource location of the channel may be determined according to the location offset, and the resource location of the control channel, namely the starting location of the resource of the channel, is not required to be indicated by the fixed subframe/slot boundary, like in an LTE system. Thus, relatively high signaling complexity and overhead brought by two-level indication of "indicating the subframe/slot where the channel is located and then indicating the symbol where the channel starts in the subframe/slot" are avoided, and improvement in the flexibility and efficiency of channel resource allocation in the wireless communication system is facilitated. Since the second indication information is transmitted through DCI, a resource of the data channel scheduled by the control channel may be dynamically indicated, and the data flexibility of channel resource allocation is further improved.

In a possible example, the at least one piece of indication information includes first indication information and second indication information, the first indication information is transmitted through RRC signaling or system information, and the second indication information is transmitted through DCI.

The first indication information includes at least one location offset, the second indication information includes an indicator corresponding to a selected location offset, the indicator is configured to indicate that the location offset between the data channel and the first control channel or between the second control channel and the first control channel is the selected location offset, and the selected location offset is a location offset selected from the at least one location offset.

It can be seen that, in the possible example, the first indication information and the second indication information are transmitted between the network-side device and the terminal and the location offset between the data channel and the first control channel or between the second control channel and the first control channel is jointly indicated through the first indication information and the second indication information. Compared with indication by the first indication information only, this manner may dynamically indicate the channel resource scheduled by the first control channel through DCI, which improves the flexibility of channel resource allocation; and compared with indication by the second indication information only, this manner limits the selected location offset to be values of a few location offsets through RRC signaling or system information, which may reduce the signaling overhead and improve the efficiency of data channel resource allocation.

In the abovementioned possible example, the at least one piece of indication information includes the first indication information and the second indication information, the first indication information is transmitted through RRC signaling or system information, and the second indication information is transmitted through DCI.

A first location offset in the first indication information is configured to indicate the location offset between the data channel and the first control channel or between the second control channel and the first control channel, a second location offset in the second indication information is configured to indicate the location offset between the data channel and the first control channel or between the second control channel and the first control channel, and the second location offset is configured for the terminal to, responsive to detecting that the second location offset is different from the first location offset, determine the second location offset as the location offset between the data channel and the first control channel or between the second control channel and the first control channel.

It can be seen that, in the example, the first indication information and the second indication information are transmitted between the network-side device and the terminal, the first indication information includes the first location offset, the second indication information includes the second location offset, the data channel indicated by the second location offset is the same as the data channel indicated by the first location offset, and the second location offset is configured for the terminal to, responsive to detecting that the second location offset is different from the first location offset, determine the second location offset as the location offset between the data channel and the first control channel or between the second control channel and the first control channel, namely the second location offset may overturn the first location offset. Compared with indication by the first indication information only, this manner may dynamically indicate the channel resource scheduled by the first control channel through the second indication information, which is favorable for improving the data flexibility and accuracy of channel resource allocation; and compared with indication by the second indication information only, this manner may reduce the signaling overhead and improve the efficiency of data channel resource allocation.

In a possible example, the at least one piece of indication information includes second indication information, and the second indication information is transmitted through DCI.

The data channel includes time-domain resources in multiple frequency-domain resource elements, the second indication information includes multiple time-domain location offsets corresponding to the multiple frequency-domain resource elements, and each time-domain location offset is configured to indicate the time-domain location offset between the time-domain resource in the corresponding frequency-domain resource element and the first control channel.

It can be seen that, in the example, the second indication information indicates different time-domain location offsets for multiple frequency-domain resource elements to support the time-domain resources of the data channel or the second control channel in different frequency-domain resource elements to start from different time-domain locations, so that more flexible and efficient data channel resource allocation is implemented.

In a possible example, the at least one piece of indication information includes first indication information and second indication information, the first indication information is transmitted through RRC signaling or system information, and the second indication information is transmitted through DCI.

The data channel or the second control channel includes time-domain resources in multiple frequency-domain resource elements, the first indication information includes at least one time-domain location offset, the second indication information includes multiple indicators corresponding to the multiple frequency-domain resource elements, the multiple indicators further correspond to multiple time-domain location offsets selected from the at least one time-domain location offset, and each indicator in the multiple indicators is configured to indicate that the location offset between the data channel in the corresponding frequency-domain resource element and the first control channel is the time-domain location offset corresponding to the indicator.

In a possible example, the at least one piece of indication information further includes a default location offset, and the default location offset is configured for the terminal, when not obtaining the location offset between the data channel and the first control channel or between the second control channel and the first control channel from the first indication information and the second indication information, to determine the location offset between the data channel and the first control channel or between the second control channel and the first control channel.

It can be seen that, in the example, for the data channel or second control channel of which the time-domain location offset is not explicitly indicated by the first indication information and the second indication information, the time-domain location offset of the data channel or the second control channel relative to the first control channel may be determined through a default time-domain location offset, so that the condition that a time-domain location of the data channel may not be determined in the case of false detection and missing of related control signaling is avoided, and improvement in reliability of channel resource allocation in the wireless communication system is facilitated.

In a possible example, the at least one piece of indication information further includes third indication information, the third indication information is configured to indicate a time-domain length of the data channel, and the third indication information is transmitted through RRC signaling and/or DCI.

It can be seen that, in the example, the at least one piece of indication information transmitted between the network-side device and the terminal may further include the third indication information configured to indicate the time-domain length of the data channel, so that more flexible and efficient data channel resource allocation is implemented, and improvement in the flexibility and efficiency of data channel resource configuration in the wireless communication system is facilitated.

The embodiment of the disclosure will specifically be described below in combination with specific application scenarios.

Figure 3A:
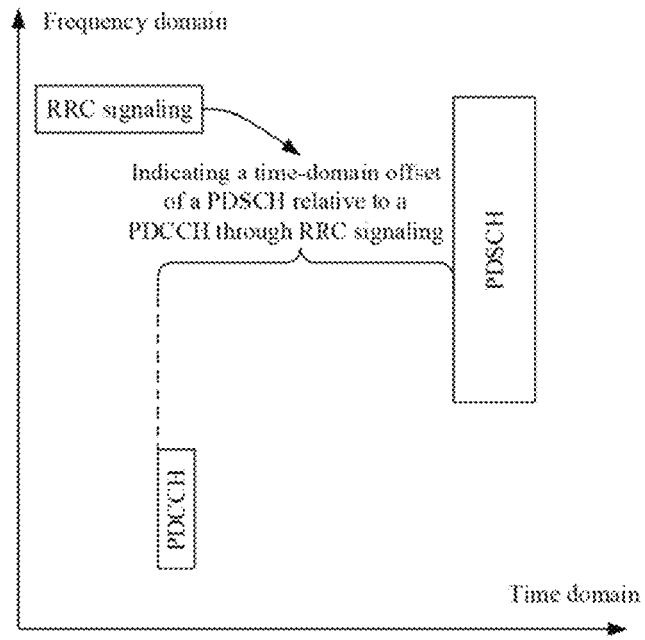
FIG. 3A is a schematic diagram of indicating a time-domain location offset of a PDSCH relative to a PDCCH through RRC signaling according to an embodiment of the disclosure.

Referring to FIG. 3A, a data channel is a PDSCH, and a control channel is a PDCCH. FIG. 3A is a schematic diagram of indicating a time-domain location offset of a PDSCH relative to a PDCCH through RRC signaling according to an embodiment of the disclosure. As shown in the figure, in the embodiment, a time-domain location offset of a PDSCH relative to a PDCCH is indicated through RRC signaling. The time-domain location offset may take a symbol, several symbols, a symbol and a slot, and a symbol and a mini-slot as a unit. With adoption of this method, a resource of the scheduled PDSCH may be conveniently indicated in regardless of a symbol where the PDCCH is located. Therefore, flexible, efficient and low-delay data channel resource allocation may be implemented.

Figure 3B:
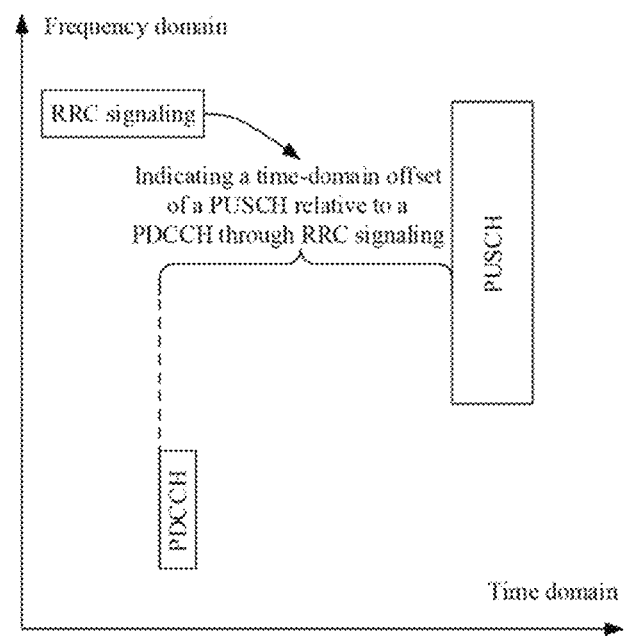
FIG. 3B is a schematic diagram of indicating a time-domain location offset of a PUSCH relative to a PDCCH through RRC signaling according to an embodiment of the disclosure.

Referring to FIG. 3B, a data channel is a PUSCH, and a control channel is a PDCCH. FIG. 3B is a schematic diagram of indicating a time-domain location offset of a PUSCH relative to a PDCCH through RRC signaling according to an embodiment of the disclosure. As shown in the figure, in the embodiment, a time-domain location offset of a PUSCH relative to a PDCCH is indicated through RRC signaling. With adoption of this method, a resource of the scheduled PUSCH may be conveniently indicated in regardless of a symbol where the PDCCH is located. Therefore, flexible, efficient and low-delay data channel resource allocation may be implemented.

Figure 3C:
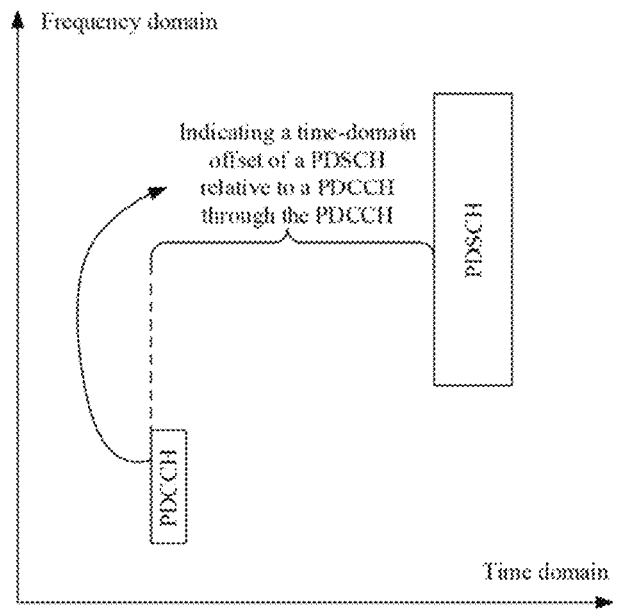
FIG. 3C is a schematic diagram of indicating a time-domain location offset of a PDSCH relative to a PDCCH through the PDCCH according to an embodiment of the disclosure.

Referring to FIG. 3C, a data channel is a PDSCH, and a control channel is a PDCCH. FIG. 3C is a schematic diagram of indicating a time-domain location offset of a PDSCH relative to a PDCCH through the PDCCH according to an embodiment of the disclosure. As shown in the figure, in the embodiment, a time-domain location offset of a PDSCH relative to a PDCCH is indicated through the PDCCH. The offset may take a symbol, several symbols, a symbol and a slot, and a symbol and a mini-slot as a unit. Compared with indication by RRC signaling, indicating the time-domain location offset between the PDSCH and the PDCCH through the PDCCH may dynamically indicate a resource of the scheduled PDSCH. Therefore, more flexible data channel resource allocation may be implemented. However, compared with indication by RRC signaling, this manner is relatively high in signaling overhead.

Figure 3D:
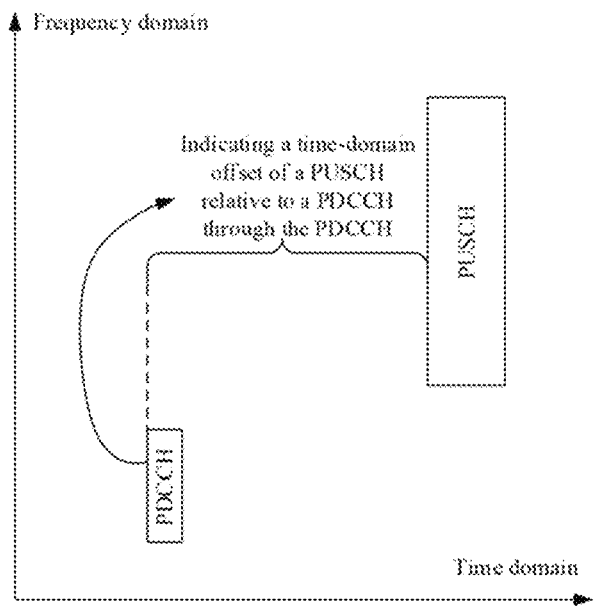
FIG. 3D is a schematic diagram of indicating a time-domain location offset of a PUSCH relative to a PDCCH through the PDCCH according to an embodiment of the disclosure.

Referring to FIG. 3D, a data channel is a PUSCH, and a control channel is a PDCCH. FIG. 3D is a schematic diagram of indicating a time-domain location offset of a PUSCH relative to a PDCCH through the PDCCH according to an embodiment of the disclosure. As shown in the figure, in the embodiment, a time-domain location offset of a PUSCH relative to a PDCCH is indicated through the PDCCH. The offset may take a symbol, several symbols, a symbol and a slot, and a symbol and a mini-slot as a unit. Compared with indication by RRC signaling, indicating the time-domain location offset between the PUSCH and the PDCCH through the PDCCH may dynamically indicate a resource of the scheduled PUSCH. Therefore, more flexible data channel resource allocation may be implemented. However, compared with indication by RRC signaling, this manner is relatively high in signaling overhead.

Figure 3E:
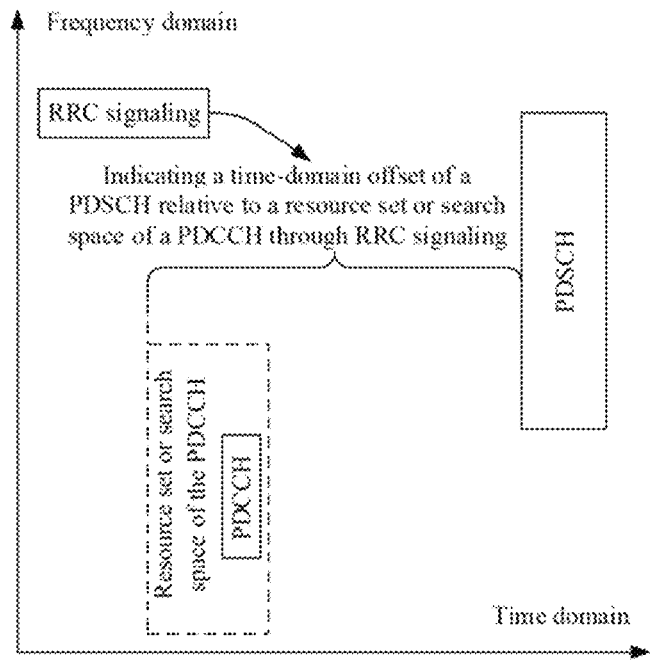
FIG. 3E illustrates a diagram of indicating a time-domain location offset of a PDSCH relative to a resource set or search space of a PDCCH through RRC signaling according to an embodiment of the disclosure.

Referring to FIG. 3E, a data channel is a PDSCH, and a control channel is a PDCCH. FIG. 3E illustrates a time-domain location offset of a PDSCH relative to a resource set or search space of a PDCCH, indicated through RRC signaling according to an embodiment of the disclosure. As shown in the figure, in the embodiment, the time-domain location offset of the PDSCH relative to a resource set or search space of the PDCCH is indicated through RRC signaling. The resource set or search space of the PDCCH is a resource range that may include the PDCCH of a terminal, and a network device may indicate the resource set or search space of the PDCCH to the terminal at first. Therefore, the time-domain location offset of the PDSCH relative to the resource set or search space of the PDCCH may be indicated to indicate a certain resource of the PDSCH scheduled by the PDCCH in regardless of a symbol where the PDCCH is located. Therefore, flexible, efficient and low-delay data channel resource allocation may be implemented. The method in the embodiment may also be adopted to indicate a time-domain location offset of a PUSCH relative to the resource set or search space of the PDCCH.

Figure 3F:
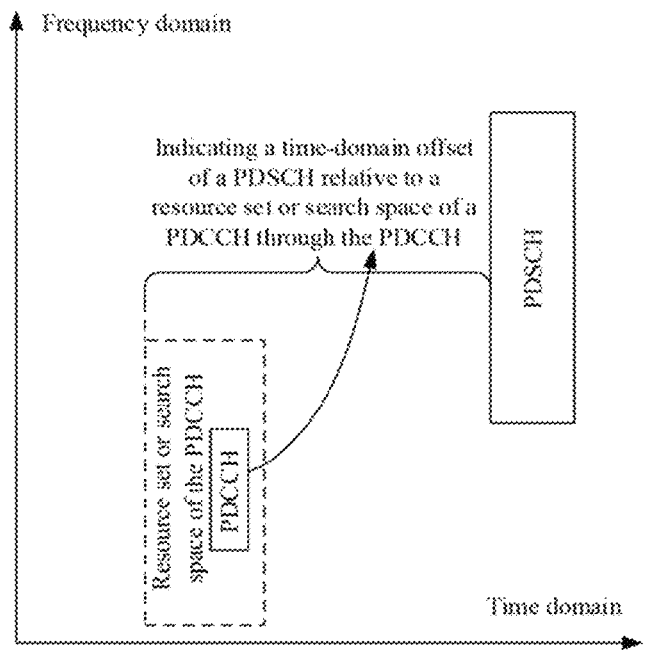
FIG. 3F illustrates a diagram of indicating a time-domain location offset of a PDSCH relative to a resource set or search space of a PDCCH through the PDCCH according to an embodiment of the disclosure.

Referring to FIG. 3F, a data channel is a PDSCH, and a control channel is a PDCCH. FIG. 3F illustrates a time-domain location offset of a PDSCH relative to a resource set or search space of a PDCCH, indicated through the PDCCH according to an embodiment of the disclosure. As shown in the figure, in the embodiment, the time-domain location offset of the PDSCH relative to the resource set or search space of the PDCCH is indicated through the PDCCH rather than RRC signaling. Compared with indication by RRC signaling, indicating the offset between the PDSCH and the resource set or search space of the PDCCH through the PDCCH may dynamically indicate a resource of the scheduled PDSCH. Therefore, more flexible data channel resource allocation may be implemented. However, compared with indication by RRC signaling, this manner is relatively high in signaling overhead. The method in the embodiment may also be adopted to indicate a time-domain location offset of a PUSCH relative to the resource set or search space of the PDCCH.

Figure 3G:
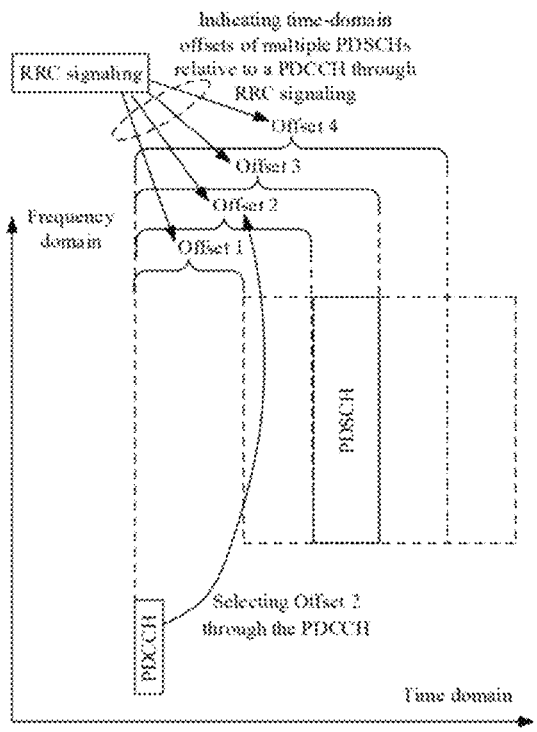
FIG. 3G is a schematic diagram of jointly indicating a time-domain location offset of a PDSCH relative to a PDCCH through RRC signaling and the PDCCH according to an embodiment of the disclosure.

Referring to FIG. 3G, a data channel is a PUSCH, and a control channel is a PDCCH. FIG. 3G is a schematic diagram of jointly indicating a time-domain location offset of a PDSCH relative to a PDCCH through RRC signaling and the PDCCH according to an embodiment of the disclosure. As shown in the figure, in the embodiment, time-domain locations of multiple PDSCHs relative to a PDCCH are indicated through RRC signaling, and then an offset in the offsets is indicated through the PDCCH. Compared with indication by RRC signaling, a PDCCH may dynamically indicate a resource of the scheduled PDSCH to improve flexibility of data channel resource allocation. Compared with indication by a PDCCH only, RRC signaling may reduce a signaling overhead and improve efficiency of data channel resource allocation. The method in the embodiment may also be adopted to indicate a time-domain location offset of a PUSCH relative to a PDCCH. The method in the embodiment may further be adopted to indicate a time-domain location offset of a PDSCH/PUSCH relative to a resource set or search space of a PDCCH.

Figure 3H:
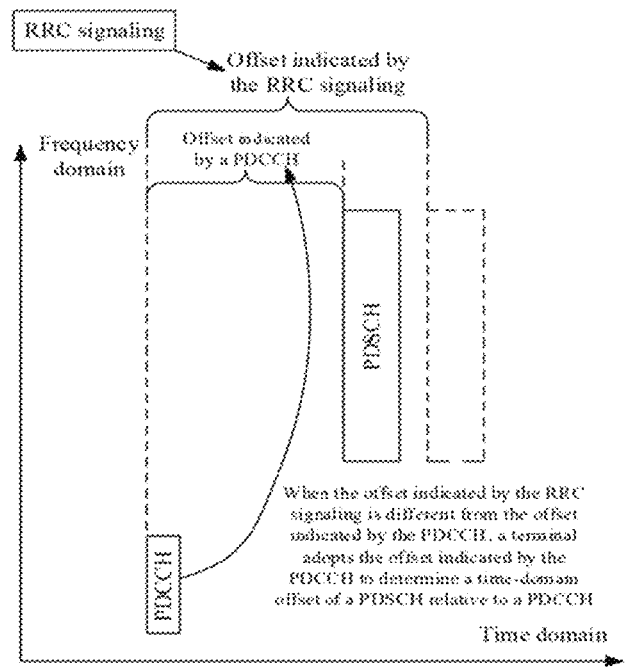
FIG. 3H is a schematic diagram of determining a time-domain location offset of a PDSCH relative to a PDCCH in a case that the PDCCH overturns an indication from RRC signaling according to an embodiment of the disclosure.

Referring to FIG. 3H, a data channel is a PDSCH, and a control channel is a PDCCH. FIG. 3H is a schematic diagram of determining a time-domain location offset of a PDSCH relative to a PDCCH in a case that the PDCCH overturns an indication from RRC signaling according to an embodiment of the disclosure. As shown in the figure, in the embodiment, a time-domain location of a PDSCH relative to a PDCCH is indicated through RRC signaling, and then a time-domain location offset of a new PDSCH relative to the PDCCH is indicated through the PDCCH. If a terminal receives different time-domain location offsets from the RRC signaling and the PDCCH, the time-domain location offset indicated by the PDCCH is adopted to determine the time-domain location offset of the PDSCH relative to the PDCCH. Compared with indication by the RRC signaling only, this manner in the embodiment may dynamically indicate a resource of the scheduled PDSCH, which may improve flexibility and accuracy of data channel resource allocation. Compared with indication by the PDCCH only, this manner in the embodiment may reduce a signaling overhead. The method in the embodiment may also be adopted to indicate a time-domain location offset of a PUSCH relative to the PDCCH. The method in the embodiment may further be adopted to indicate a time-domain location offset of a PDSCH/PUSCH relative to a resource set or search space of the PDCCH.

Figure 3I:
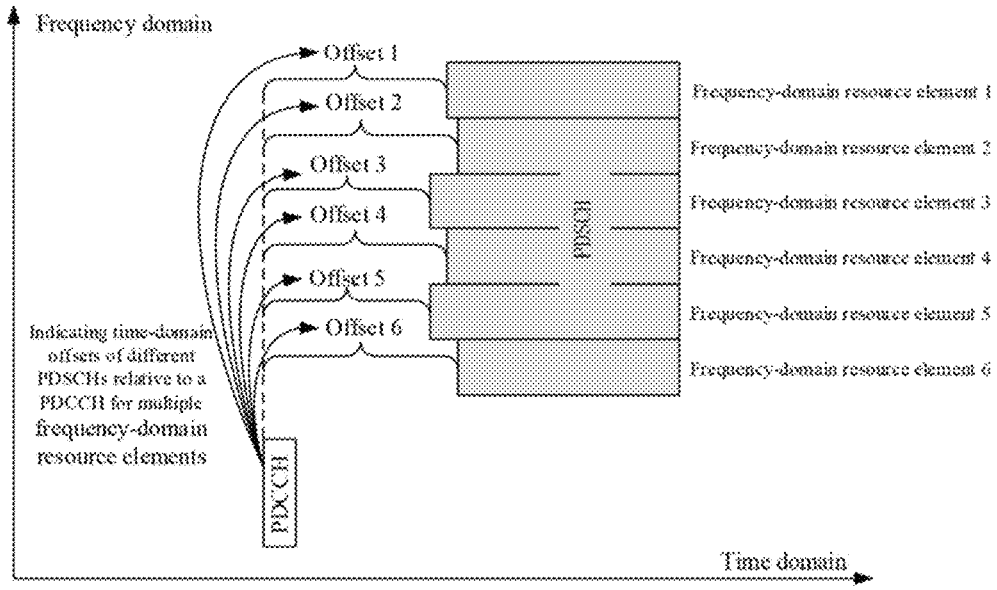
FIG. 3I is a schematic diagram of indicating time-domain location offsets of multiple PDSCHs in multiple frequency-domain resource elements relative to a PDCCH through the PDCCH according to an embodiment of the disclosure.

Referring to FIG. 3I, a data channel is a PUSCH, the PUSCH including time-domain resources in multiple frequency-domain resource elements, and a control channel is a PDCCH. FIG. 3I is a schematic diagram of indicating time-domain location offsets of time-domain resources in multiple frequency-domain resource elements relative to a PDCCH through the PDCCH according to an embodiment of the disclosure. As shown in the figure, in the embodiment, the time-domain location offset of each time-domain resource relative to the PDCCH is indicated through the PDCCH, and different time-domain location offsets are indicated for the multiple frequency-domain resource elements. In such a manner, the time-domain resources of the PUSCH in different frequency-domain resource elements may start from different time-domain locations, so that more flexible data channel resource allocation is implemented. The method in the embodiment may also be adopted to indicate a time-domain location offset of a PUSCH relative to a PDCCH. The method in the embodiment may further be adopted to indicate a time-domain location offset of a PDSCH/PUSCH relative to a resource set or search space of a PDCCH. A method of joint indication by RRC signaling and a PDCCH or a method of the PDCCH overturning indication from RRC signaling may also be adopted in the embodiment.

Figure 3J:
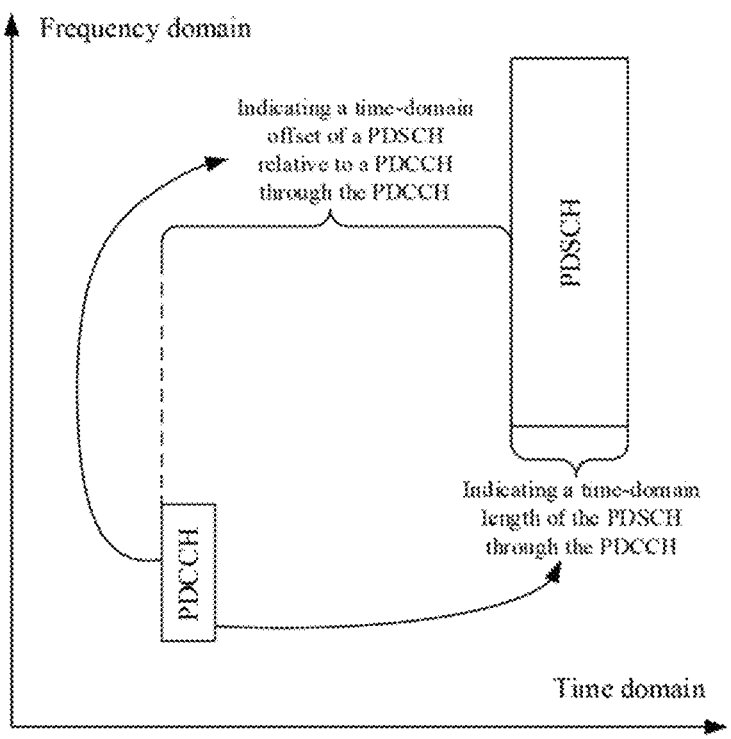
FIG. 3J is a schematic diagram of indicating a length of a PDSCH and a time-domain location offset of the PDSCH relative to a PDCCH according to an embodiment of the disclosure.

Referring to FIG. 3J, a data channel is a PDSCH, and a control channel is a PDCCH. FIG. 3J is a schematic diagram of indicating a time-domain location offset of a PDSCH relative to a PDCCH and a length of the PDSCH according to an embodiment of the disclosure. As shown in the figure, in the embodiment, not only the time-domain location offset of the PDSCH relative to the PDCCH is indicated through the PDCCH, but also a time-domain length of the PDSCH is indicated through the PDCCH. In such a manner, not only a location of the PDSCH may be flexibly configured, but also the length of the PDSCH may be flexibly configured, so that more flexible and efficient data channel resource allocation is implemented. The method in the embodiment may also be adopted to indicate a time-domain location offset of a PUSCH relative to a PDCCH and a length thereof. The method in the embodiment may further be adopted to indicate a time-domain location offset of a PDSCH/PUSCH relative to a resource set or search space of a PDCCH and a length thereof. A method of joint indication by RRC signaling and a PDCCH or a method of the PDCCH overturning indication from the RRC signaling may also be adopted in the embodiment. By the method in the embodiment, time-domain location offsets of different PDSCHs/PUSCHs relative to a PDCCH and lengths thereof may also be indicated for multiple frequency-domain resource elements.

Figure 3K:
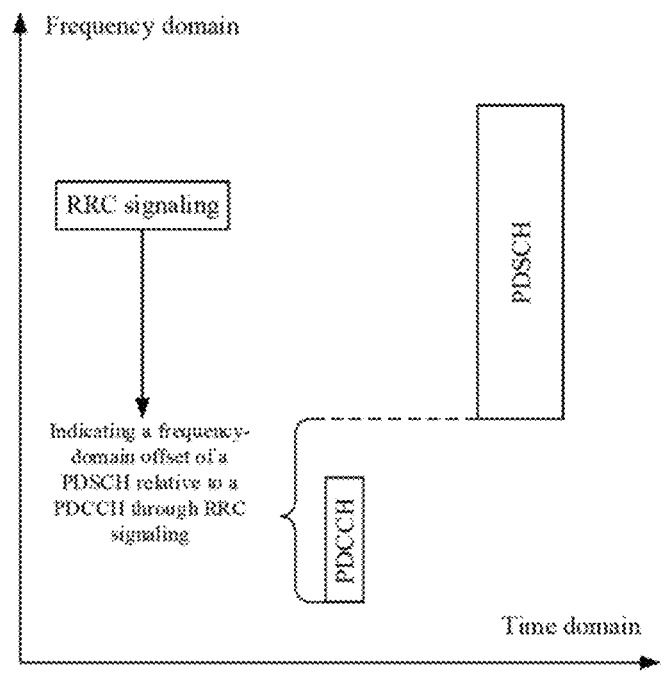
FIG. 3K is a schematic diagram of indicating a frequency-domain location offset of a PDSCH relative to a PDCCH through RRC signaling according to an embodiment of the disclosure.

Referring to FIG. 3K, a data channel is a PUSCH, and a control channel is a PDCCH. FIG. 3K is a schematic diagram of indicating a frequency-domain location offset of a PDSCH relative to a PDCCH through RRC signaling according to an embodiment of the disclosure. As shown in the figure, in the embodiment, the frequency-domain location offset rather than the time-domain location offset of the PDSCH relative to the PDCCH is indicated through RRC signaling. Since the PDCCH and the PDSCH are relatively close in a frequency domain, in the embodiment, a frequency-domain resource of the PDSCH may be flexibly allocated, and meanwhile, a signaling overhead in indicating the frequency-domain resource of the PDSCH is reduced. The method in the embodiment may also be adopted to indicate a frequency-domain location offset of a PUSCH relative to the PDCCH. The method in the embodiment may further be adopted to indicate a frequency-domain location offset of a PDSCH/PUSCH relative to a resource set or search space of the PDCCH. By the method in the embodiment, frequency-domain location offsets of different PDSCHs/PUSCHs relative to the PDCCH may also be indicated for multiple time-domain resource elements.

Figure 3L:
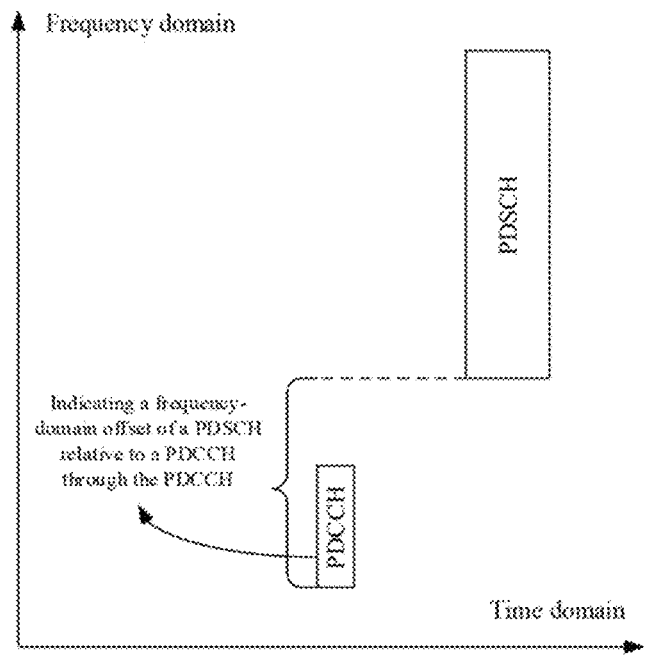
FIG. 3L illustrates a diagram of indicating a frequency-domain location offset of a PDSCH relative to a PDCCH through the PDCCH according to an embodiment of the disclosure.

Referring to FIG. 3L, a data channel is a PUSCH, and a control channel is a PDCCH. FIG. 3L illustrates a frequency-domain location offset of a PDSCH relative to a PDCCH, indicated through the PDCCH according to an embodiment of the disclosure. As shown in the figure, in the embodiment, the frequency-domain location offset rather than the time-domain location offset of a PDSCH relative to a PDCCH is indicated through the PDCCH. Since the PDCCH and the PDSCH are relatively close in a frequency domain, in the embodiment, a frequency-domain resource of the PDSCH may be flexibly allocated, and meanwhile, a signaling overhead in indicating the frequency-domain resource of the PDSCH is reduced. The method in the embodiment may also be adopted to indicate a frequency-domain location offset of a PUSCH relative to the PDCCH. The method in the embodiment may further be adopted to indicate a frequency-domain location offset of a PDSCH/PUSCH relative to a resource set or search space of the PDCCH. A method of joint indication by RRC signaling and a PDCCH or a method of the PDCCH overturning indication from the RRC signaling may also be adopted in the embodiment. By the method in the embodiment, frequency-domain location offsets of different PDSCHs/PUSCHs relative to the PDCCH may also be indicated for multiple time-domain resource elements.

Figure 3M:
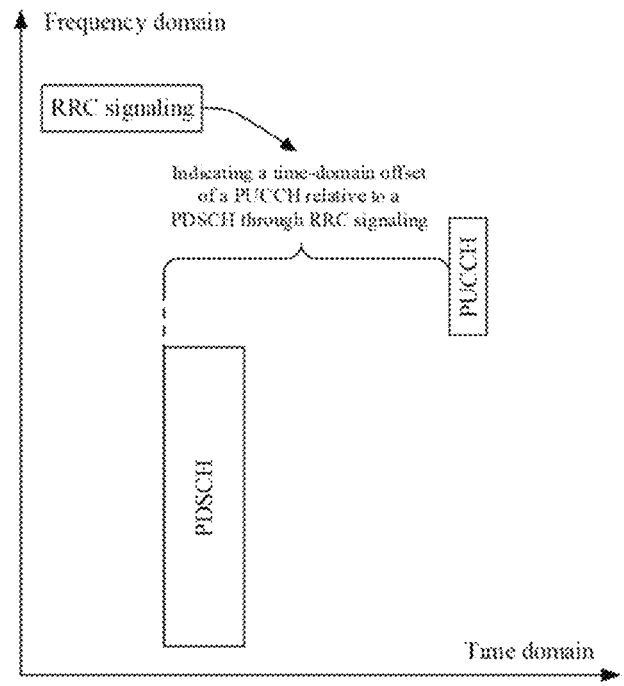
FIG. 3M is a schematic diagram of indicating a time-domain location offset of a PUCCH relative to a PDSCH through RRC signaling according to an embodiment of the disclosure.

Referring to FIG. 3M, a data channel is a PDSCH, and a control channel is a PUCCH. FIG. 3M is a schematic diagram of indicating a time-domain location offset of a PUCCH relative to a PDSCH through RRC signaling according to an embodiment of the disclosure. As shown in the figure, in the embodiment, the time-domain location offset of a PUCCH relative to a PDSCH is indicated through RRC signaling. The time-domain location offset may take a symbol, several symbols, a symbol and a slot, and a symbol and a mini-slot as a unit. With adoption of the method, a resource of a corresponding PUCCH (for example, a PUCCH for transmitting an Acknowledgment (ACK)/Negative Acknowledgment (NACK) corresponding to a PDSCH) may be conveniently indicated in regardless of a symbol where the PDSCH is located. Therefore, flexible, efficient and low-delay control channel resource allocation may be implemented.

Figure 3N:
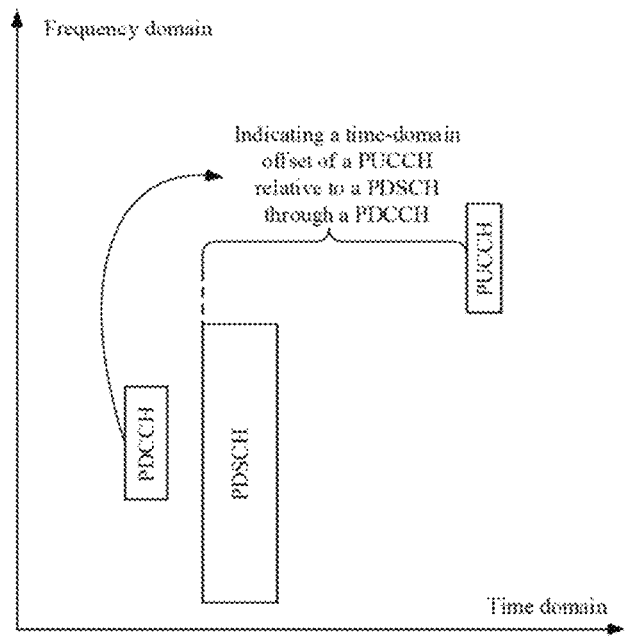
FIG. 3N is a schematic diagram of indicating a time-domain location offset of a PUCCH relative to a PDSCH through a PDCCH according to an embodiment of the disclosure.

Referring to FIG. 3N, a data channel is a PDSCH, and a control channel is a PUCCH. FIG. 3M is a schematic diagram of indicating a time-domain location offset of a PUCCH relative to a PDSCH through a PDCCH according to an embodiment of the disclosure. As shown in the figure, in the embodiment, the time-domain location offset of a PUCCH relative to a PDSCH is indicated through a PDCCH. The offset may take a symbol, several symbols, a symbol and a slot, and a symbol and a mini-slot as a unit.

Compared with indication by RRC signaling, indicating a time-domain location offset between a PUCCH and a PDSCH through a PDCCH may dynamically indicate a resource of the corresponding PUCCH (for example, a PUCCH for transmitting an ACK/NACK corresponding to the PDSCH). Therefore, more flexible control channel resource allocation may be implemented. However, compared with indication by RRC signaling, this manner is relatively high in signaling overhead.

Figure 3O:
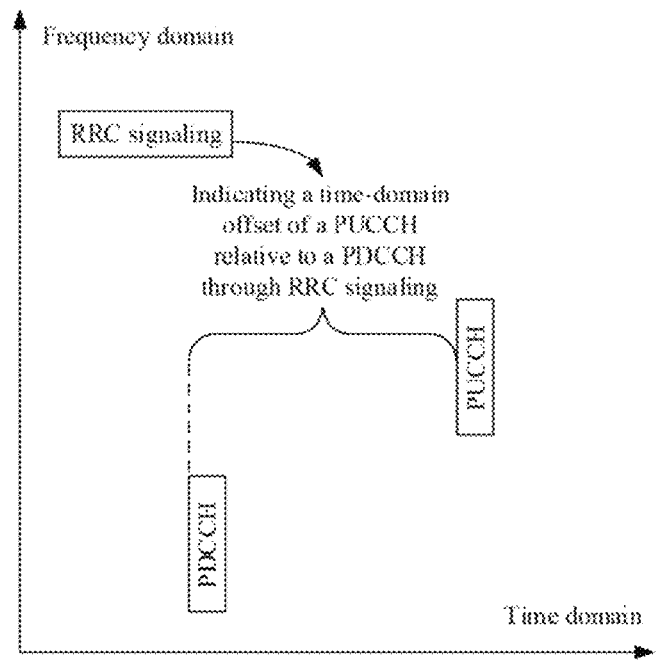
FIG. 3O is a schematic diagram of indicating a time-domain location offset of a PUCCH relative to a PDCCH through RRC signaling according to an embodiment of the disclosure.

Referring to FIG. 3O, one control channel is a PDCCH, and the other control channel is a PUCCH. FIG. 3O is a schematic diagram of indicating a time-domain location offset of a PUCCH relative to a PDCCH through RRC signaling according to an embodiment of the disclosure. As shown in the figure, in the embodiment, the time-domain location offset of a PUCCH relative to a PDCCH is indicated through RRC signaling. The time-domain location offset may take a symbol, several symbols, a symbol and a slot, and a symbol and a mini-slot as a unit. With adoption of this method, a resource of a PUCCH may be conveniently indicated in regardless of a symbol where a PDCCH is located. Therefore, flexible, efficient and low-delay control channel resource allocation may be implemented.

Figure 3P:
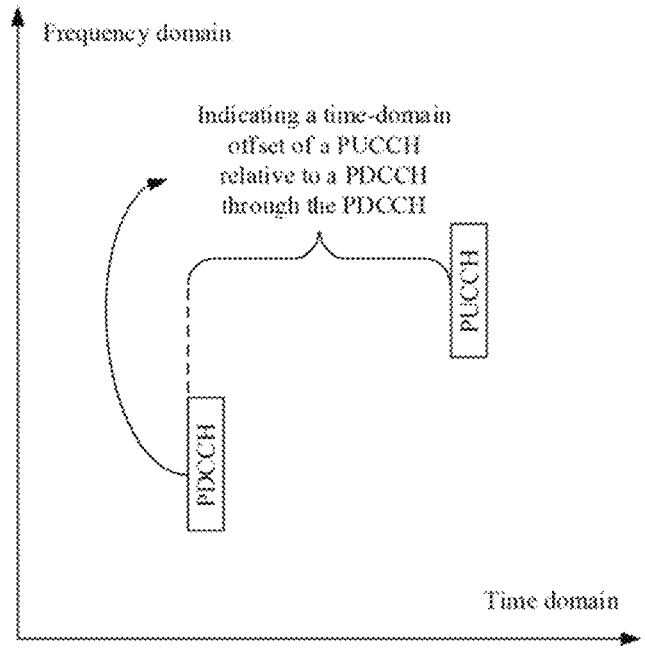
FIG. 3P is a schematic diagram of indicating a time-domain location offset of a PUCCH relative to a PDCCH through the PDCCH according to an embodiment of the disclosure.

Referring to FIG. 3P, one control channel is a PDCCH, and the other control channel is a PUCCH. FIG. 3P is a schematic diagram of indicating a time-domain location offset of a PUCCH relative to a PDCCH through the PDCCH according to an embodiment of the disclosure. As shown in the figure, in the embodiment, the time-domain location offset of a PUCCH relative to a PDCCH is indicated through the PDCCH. The offset may take a symbol, several symbols, a symbol and a slot, and a symbol and a mini-slot as a unit. Compared with indication by RRC signaling, indicating the time-domain location offset between a PUCCH and a PDCCH through the PDCCH may dynamically indicate a resource of the PUCCH. Therefore, more flexible control channel resource allocation may be implemented. However, compared with indication by RRC signaling, this manner is relatively high in signaling overhead.

Figure 3Q:
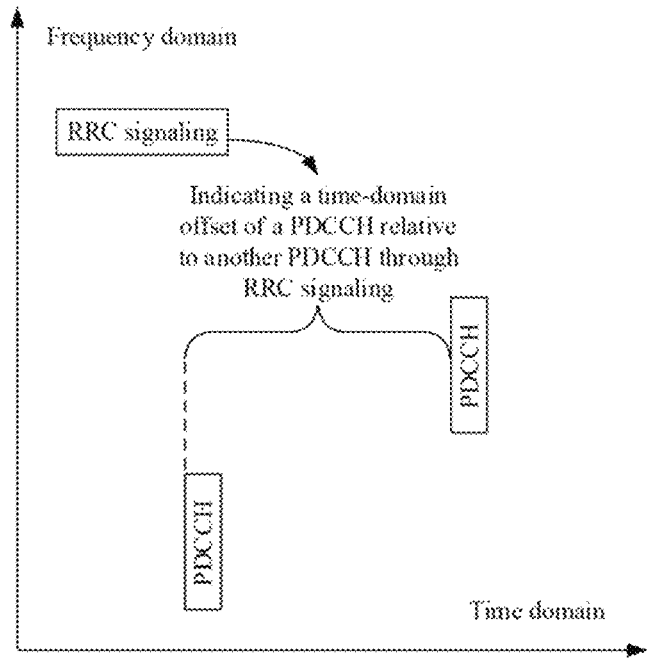
FIG. 3Q is a schematic diagram of indicating a time-domain location offset of a PDCCH relative to another PDCCH through RRC signaling according to an embodiment of the disclosure.

Referring to FIG. 3Q, one control channel is a PDCCH, and the other control channel is a PDCCH. FIG. 3Q is a schematic diagram of indicating a time-domain location offset of a PDCCH relative to another PDCCH through RRC signaling according to an embodiment of the disclosure. As shown in the figure, in the embodiment, the time-domain location offset of a PDCCH relative to another PDCCH is indicated through RRC signaling. The time-domain location offset may take a symbol, several symbols, a symbol and a slot, and a symbol and a mini-slot as a unit. With adoption of this method, a resource of another PDCCH may be conveniently indicated in regardless of a symbol where the first PDCCH is located. Therefore, flexible, efficient and low-delay control channel resource allocation may be implemented.

Figure 3R:
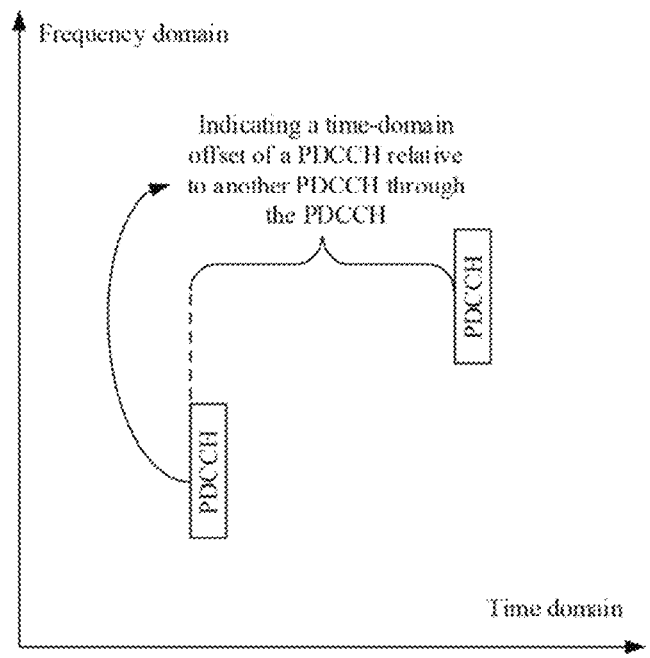
FIG. 3R is a schematic diagram of indicating a time-domain location offset of a PDCCH relative to another PDCCH through the PDCCH according to an embodiment of the disclosure.

Referring to FIG. 3R, one control channel is a PDCCH, and another control channel is a PDCCH. FIG. 3R is a schematic diagram of indicating a time-domain location offset of a PDCCH relative to another PDCCH through the PDCCH according to an embodiment of the disclosure. As shown in the figure, in the embodiment, the time-domain location offset of a PDCCH relative to another PDCCH is indicated through the PDCCH. The offset may take a symbol, several symbols, a symbol and a slot, and a symbol and a mini-slot as a unit. Compared with indication by RRC signaling, indicating the time-domain location offset between the PDCCH and another PDCCH through the PDCCH may dynamically indicate a resource of the PDCCH. Therefore, more flexible control channel resource allocation may be implemented. However, compared with indication by RRC signaling, this manner is relatively high in signaling overhead.

Figure 4:
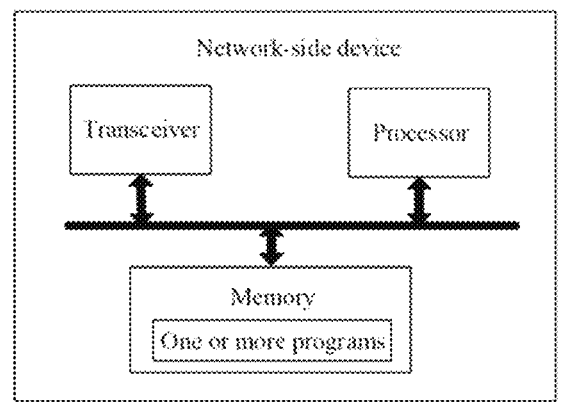
FIG. 4 is a structure diagram of a network-side device according to an embodiment of the disclosure.

Consistent with the embodiments shown in FIG. 2A and FIG. 2B, referring to FIG. 4, FIG. 4 is a structure diagram of a network-side device according to an embodiment of the disclosure. As shown in the figure, the network-side device includes one or more processors, a memory, a transceiver and one or more programs. The one or more programs are stored in the memory and are configured to be executed by the one or more processors. The programs include instructions configured to execute the following step.

At least one piece of indication information is sent, the at least one piece of indication information being configured to indicate a location offset between a data channel and a first control channel or between a second control channel and the first control channel, the location offset including a time-domain location offset and/or a frequency-domain location offset and the time-domain location offset being a symbol-level offset.

It can be seen that, in the embodiment of the disclosure, at least one piece of indication information is transmitted between a network-side device and a terminal, the at least one piece of indication information being configured to indicate a location offset between a data channel and a first control channel or between a second control channel and the first control channel. Since the location offset includes a time-domain location offset and/or a frequency-domain location offset and the time-domain location offset is a symbol-level offset, a time-frequency resource of the data channel or the second control channel may be conveniently determined according to the location offset in regardless of a symbol where the first control channel is located respectively, namely a starting location of the resource of the channel is not required to be indicated by a fixed subframe/slot boundary, like in an LTE system. Therefore, relatively high signaling complexity and overhead brought by two-level indication of "indicating a subframe/slot where the channel is located and then indicating a symbol where the channel starts in the subframe/slot" are avoided, and improvement in flexibility and efficiency of channel resource allocation in a wireless communication system is facilitated.

In a possible example, the at least one piece of indication information includes first indication information, and the first indication information is transmitted through RRC signaling or system information; and the first indication information is configured to indicate the location offset between the data channel and the first control channel or between the second control channel and the first control channel.

It can be seen that, in the example, the first indication information is transmitted between the network-side device and the terminal, and the first indication information may directly indicate the location offset between the data channel and the first control channel or between the second control channel and the first control channel, so that a resource location of the channel may be determined according to the location offset and a resource location of the first control channel, namely the starting location of the resource of the channel is not required to be indicated by the fixed subframe/slot boundary, like in an LTE system. Thus, relatively high signaling complexity and overhead brought by two-level indication of "indicating the subframe/slot where the channel is located and then indicating the symbol where the channel starts in the subframe/slot" are avoided, and improvement in the flexibility and efficiency of channel resource allocation in a wireless communication system is facilitated. Since the first indication information is transmitted through RRC signaling or system information, a signaling overhead is relatively low, data transmission efficiency of channel resource allocation is further improved, and a signaling reading delay is reduced.

In a possible example, the at least one piece of indication information includes second indication information, and the second indication information is transmitted through DCI; and the second indication information is configured to indicate the location offset of the data channel relative to the control channel.

It can be seen that, in the example, the second indication information is transmitted between the network-side device and the terminal, and the second indication information may directly indicate the location offset between the data channel and the first control channel or between the second control channel and the first control channel, so that the resource location of the channel may be determined according to the location offset and the resource location of the control channel, namely the starting location of the resource of the channel is not required to be indicated by the fixed subframe/slot boundary, like in the LTE system. Thus, relatively high signaling complexity and overhead brought by two-level indication of "indicating the subframe/slot where the channel is located and then indicating the symbol where the channel starts in the subframe/slot" are avoided, and improvement in the flexibility and efficiency of channel resource allocation in a wireless communication system is facilitated. Since the second indication information is transmitted through DCI, a resource of the data channel scheduled by the control channel may be dynamically indicated, and the data flexibility of channel resource allocation is further improved.

In a possible example, the at least one piece of indication information includes first indication information and second indication information, the first indication information is transmitted through RRC signaling or system information, and the second indication information is transmitted through DCI.

The first indication information includes at least one location offset, the second indication information includes an indicator corresponding to a selected location offset, the indicator is configured to indicate that the location offset between the data channel and the first control channel or between the second control channel and the first control channel is a selected location offset, and the selected location offset is a location offset selected from the at least one location offset.

It can be seen that, in the example, the first indication information and the second indication information are transmitted between the network-side device and the terminal, and the location offset between the data channel and the first control channel or between the second control channel and the first control channel is jointly indicated through the first indication information and the second indication information. Compared with indication by the first indication information only, this manner may dynamically indicate the channel resource scheduled by the first control channel through DCI, which improves the flexibility of channel resource allocation; and compared with indication by the second indication information only, this manner limits the selected location offset to be values of a few location offsets through RRC signaling or system information, which may reduce the signaling overhead and improve the efficiency of data channel resource allocation.

In a possible example, the at least one piece of indication information includes first indication information and second indication information, the first indication information is transmitted through RRC signaling or the system information, and the second indication information is transmitted through DCI.

A first location offset in the first indication information is configured to indicate the location offset between the data channel and the first control channel or between the second control channel and the first control channel, a second location offset in the second indication information is configured to indicate the location offset between the data channel and the first control channel or between the second control channel and the first control channel, and the second location offset is configured for the terminal to, responsive to detecting that the second location offset is different from the first location offset, determine the second location offset as the location offset between the data channel and the first control channel or between the second control channel and the first control channel.

It can be seen that, in the example, the first indication information and the second indication information are transmitted between the network-side device and the terminal, the first indication information includes the first location offset, the second indication information includes the second location offset, the data channel indicated by the second location offset is the same as the data channel indicated by the first location offset, and the second location offset is configured for the terminal to, responsive to detecting that the second location offset is different from the first location offset, determine the second location offset as the location offset between the data channel and the first control channel or between the second control channel and the first control channel, namely the second location offset may overturn the first location offset. Compared with indication by the first indication information only, this manner may dynamically indicate the channel resource scheduled by the first control channel through the second indication information, which is favorable for improving the flexibility of and accuracy data channel resource allocation; and compared with indication by the second indication information only, this manner may reduce the signaling overhead and improve the efficiency of data channel resource allocation.

In a possible example, the at least one piece of indication information includes second indication information, and the second indication information is transmitted through DCI.

The data channel or the second control channel includes time-frequency resources in multiple frequency-domain resource elements, the second indication information includes multiple time-domain location offsets corresponding to the multiple frequency-domain resource elements, and each time-domain location offset is configured to indicate the time-domain location offset between the time-frequency resource in the corresponding frequency-domain resource element and the control channel.

It can be seen that, in the example, the second indication information indicates different time-domain location offsets for multiple frequency-domain resource elements to ensure that time-domain resources of the data channel or the second control channel in different frequency-domain resource elements start from different time-domain locations, so that more flexible and efficient channel resource allocation is implemented.

In a possible example, the at least one piece of indication information includes third indication information, the third indication information is configured to indicate a time-domain length of the data channel, and the third indication information is transmitted through RRC signaling and/or DCI.

It can be seen that, in the example, the at least one piece of indication information transmitted between the network-side device and the terminal may further include third indication information configured to indicate the time-domain length of the data channel, so that more flexible and efficient data channel resource allocation is implemented, and improvement in the flexibility and efficiency of data channel resource configuration of the wireless communication system is facilitated.

Figure 5:
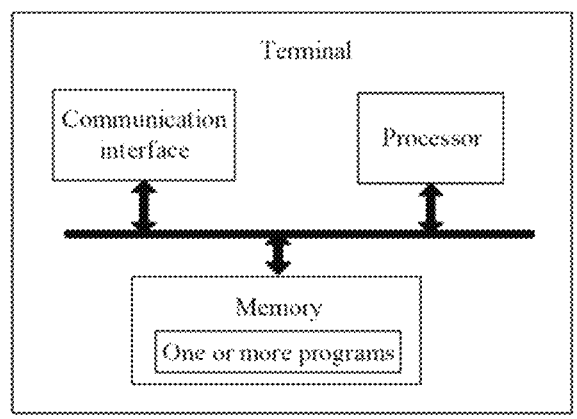
FIG. 5 is a structure diagram of a terminal according to an embodiment of disclosure.

Similar to the embodiment shown in FIG. 2A, referring to FIG. 5, FIG. 5 is a structure diagram of a terminal according to an embodiment of the disclosure. As shown in the figure, the terminal includes one or more processors, a memory, a communication interface and one or more programs. The one or more programs are stored in the memory and are configured to be executed by the one or more processors. The programs include instructions configured to execute the following step.

At least one piece of indication information is received, the at least one piece of indication information being configured to indicate a location offset between a data channel and a first control channel or between a second control channel and the first control channel, the location offset including a time-domain location offset and/or a frequency-domain location offset and the time-domain location offset being a symbol-level offset.

It can be seen that, in the embodiment of the disclosure, the at least one piece of indication information is transmitted between a network-side device and a terminal, the at least one piece of indication information being configured to indicate a location offset between a data channel and a first control channel or between a second control channel and the first control channel. Since a location offset includes a time-domain location offset and/or a frequency-domain location offset and the time-domain location offset is a symbol-level offset, a time-frequency resource of the data channel or the second control channel may be conveniently determined according to the location offset in regardless of a symbol where the first control channel is located respectively, namely a starting location of the resource of the channel is not required to be indicated by a fixed subframe/slot boundary, like in an LTE system. Thus, relatively high signaling complexity and overhead brought by two-level indication of "indicating a subframe/slot where the channel is located and then indicating a symbol where the channel starts in the subframe/slot" are avoided, and improvement in flexibility and efficiency of channel resource allocation in a wireless communication system is facilitated.

In a possible example, the at least one piece of indication information includes first indication information, and the first indication information is transmitted through RRC signaling or system information; and the first indication information is configured to indicate the location offset between the data channel and the first control channel or between the second control channel and the first control channel.

In a possible example, the at least one piece of indication information includes second indication information, and the second indication information is transmitted through DCI; and the second indication information is configured to indicate the location offset between the data channel and the first control channel or between the second control channel and the first control channel.

In a possible example, the at least one piece of indication information includes the first indication information and the second indication information, the first indication information is transmitted through RRC signaling or system information, and the second indication information is transmitted through DCI.

The first indication information includes at least one location offset, the second indication information includes an indicator corresponding to a selected location offset, the indicator is configured to indicate that the location offset of the data channel relative to the control channel is the selected location offset, and the selected location offset is a location offset selected from the at least one location offset.

In a possible example, the at least one piece of indication information includes the first indication information and the second indication information, the first indication information is transmitted through RRC signaling or system information, and the second indication information is transmitted through DCI.

A first location offset in the first indication information is configured to indicate the location offset between the data channel and the first control channel or between the second control channel and the first control channel, a second location offset in the second indication information is configured to indicate the location offset between the data channel and the first control channel or between the second control channel and the first control channel, and the second location offset is configured for the terminal to, responsive to detecting that the second location offset is different from the first location offset, determine the second location offset as the location offset between the data channel and the first control channel or between the second control channel and the first control channel.

In a possible example, the at least one piece of indication information includes the second indication information, and the second indication information is transmitted through DCI.

The data channel or the second control channel includes time-frequency resources in multiple frequency-domain resource elements, the second indication information includes multiple time-domain location offsets corresponding to the multiple frequency-domain resource elements, and each time-domain location offset in the time-domain location offsets is configured to indicate the time-domain location offset between the time-frequency resource in the corresponding frequency-domain resource element and the first control channel.

In a possible example, the at least one piece of indication information includes third indication information, the third indication information is configured to indicate a time-domain length of the data channel, and the third indication information is transmitted through RRC signaling and/or DCI.

The solutions of the embodiments of the disclosure are introduced mainly from the angle of interaction between network elements. It can be understood that, for realizing the functions, the terminal and the network-side device include corresponding hardware structures and/or software modules for executing each function. Those skilled in the art may easily realize that the units and algorithm steps of each example described in combination with the embodiments disclosed in the disclosure may be implemented by hardware or a combination of the hardware and computer software in the disclosure. Whether a certain function is executed by hardware or in a manner of driving hardware by computer software depends on specific applications and design constraints of the technical solutions. Professionals may realize the described functions for each specific application by use of different methods, but such realization shall fall within the scope of the disclosure.

According to the embodiments of the disclosure, functional units of the terminal and the network-side device may be divided according to the abovementioned method examples. For example, each functional unit may be divided correspondingly to each function and two or more than two functions may also be integrated into a processing unit. The integrated unit may be implemented in a hardware form and may also be implemented in form of software program module. It is to be noted that division of the units in the embodiment of the disclosure is schematic and only logical function division. Other division manners may be adopted in practice.

Figure 6:
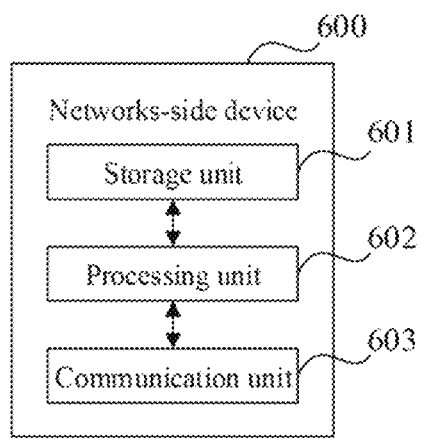
FIG. 6 is a composition block diagram of functional units of a network-side device according to an embodiment of the disclosure.

Under the condition that an integrated unit is adopted, FIG. 6 is a possible composition block diagram of functional units of a network-side device involved in the abovementioned embodiments. The network-side device 600 includes a processing unit 602 and a communication unit 603. The processing unit 602 is configured to control and manage an operation of a network-side device. For example, the processing unit 602 is configured to support the network-side device to execute the operations 2a01 and 2a06 in FIG. 2A and the operations 2b01 and 2b06 in FIG. 2B, and/or is configured for another process of a technology described in the disclosure. The communication unit 603 is configured to support communication between the network-side device and another device, for example, communication with the terminal shown in FIG. 5. The network-side device may further include a storage unit 601, configured to store a program code and data of the network-side device.

Here, the processing unit 602 may be a processor or a controller, which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof. It may implement or execute various exemplary logical blocks, modules and circuits described in combination with the contents disclosed in the disclosure. The processor may also be a combination which may realize a calculation function, for example, including a combination of one or more microprocessors and a combination of a DSP and a microprocessor. The communication unit 603 may be a transceiver, a transceiver circuit, a Radio Frequency (RF) chip and the like. The storage unit 601 may be a memory.

When the processing unit 602 is a processor, the communication unit 603 is a communication interface and the storage unit 601 is a memory, the network-side device involved in the embodiment of the disclosure may be the network-side device shown in FIG. 4.

Figure 7:
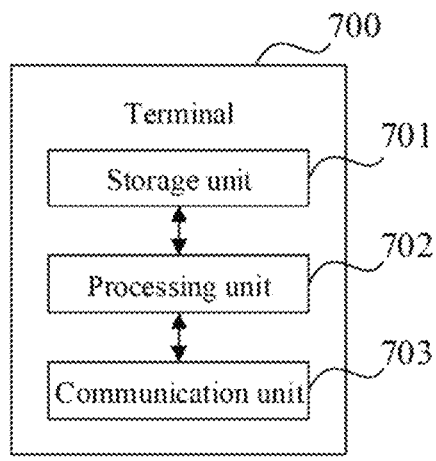
FIG. 7 is a composition block diagram of functional units of a terminal according to an embodiment of the disclosure.
Figure 8:
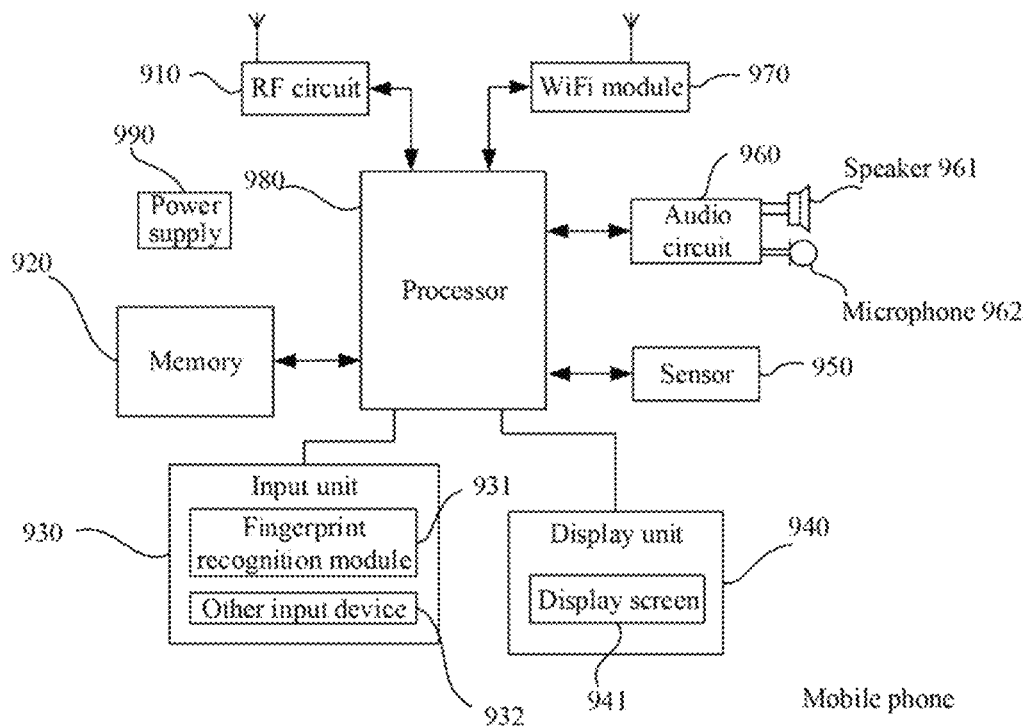
FIG. 8 is a structure diagram of another terminal according to an embodiment of the disclosure.

Under the condition that an integrated unit is adopted, FIG. 7 is a possible composition block diagram of functional units of a terminal involved in the abovementioned embodiments. The terminal 700 includes a processing unit 702 and a communication unit 703. The processing unit 702 is configured to control and manage an operation of the terminal. For example, the processing unit 702 is configured to support the terminal to execute the operations 2a02-2a05 in FIG. 2A and the operations 2b02-2b05 in FIG. 2B, and/or is configured for another process of a technology described in the disclosure. The communication unit 703 is configured to support communication between the terminal and another device, for example, communication with the network-side device shown in FIG. 4. The terminal may further include a storage unit 701, configured to store a program code and data of the terminal.

The processing unit 702 may be a processor or a controller, which may be, for example, a CPU, a DSP, an ASIC, an FPGA or another programmable logical device, transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 703 may be a transceiver, a transceiver circuit and the like. The storage unit 701 may be a memory.

When the processing unit 702 is a processor, the communication unit 703 is a communication interface and the storage unit 701 is a memory, the terminal involved in the embodiment of the disclosure may be the terminal shown in FIG. 5.

An embodiment of the disclosure also provides another terminal. As shown in FIG. 9, for convenient description, only the parts related to the embodiment of the application are shown, and specific technical details which are undisclosed refer to parts of the method in the embodiments of the disclosure. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 9 is a block diagram of part of a structure of a mobile phone related to a terminal according to an embodiment of the disclosure. Referring to FIG. 9, the mobile phone includes components such as an RF circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone shown in FIG. 9 is not intended to limit the mobile phone and may include components more or fewer than those shown in the figure or some components are combined or different component arrangements are adopted.

Each component of the mobile phone will be specifically introduced below in combination with FIG. 9.

The RF circuit 910 may be configured to receive and send information. The RF circuit 910 usually includes, but is not limited to, an antenna, at least one amplifier, a transceiver, a coupler, a Low Noise Amplifier (LNA), a duplexer and the like. In addition, the RF circuit 910 may also communicate with a network and another device through wireless communication. Any communication standard or protocol may be adopted for wireless communication, including, but not limited to, a GSM, GPRS, CDMA, WCDMA, LTE, an electronic mail, Short Messaging Service (SMS) and the like.

The memory 920 may be configured to store a software program and a module. The processor 980 operates the software program and module stored in the memory 920, thereby executing various function applications and data processing of the mobile phone. The memory 920 may mainly include a program storage region and a data storage region. The program storage region may store an operating system, an application program required by at least one function and the like. The data storage region may store data created based on the use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to the user setting and function control of the mobile phone. Specifically, the input unit 930 may include a fingerprint recognition module 931 and another input device 932. The fingerprint recognition module 931 may acquire fingerprint data of a user thereon. Besides the fingerprint recognition module 931, the input unit 930 may further include the other input device 932. Specifically, the other input device 932 may include, but not limited to, one or more of a touch screen, a physical keyboard, a function key (for example, a volume control button and a switch button), a trackball, a mouse, a stick and the like.

The display unit 940 may be configured to display information input by a user or information provided for the user and various menus of the mobile phone. The display unit 940 may include a display screen 941. Optionally, the display screen 941 may be configured in form of Liquid Crystal Display (LCD) and Organic Light-Emitting Diode (OLED). In FIG. 9, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and other sensors. Specifically, the light sensor may include an environmental light sensor and a proximity sensor. The environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application for recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960 includes a speaker 961, and a microphone 962 may provide an audio interface between the user and the mobile phone. The audio circuit 960 may transmit an electric signal obtained by converting received audio data to the speaker 961, and the speaker 961 converts it into a sound signal for playing. On the other hand, the microphone 962 converts a collected sound signal into an electric signal, the audio circuit 960 receives and converts it into audio data, and the audio data is processed by the playing processor 980 and sent to, for example, another mobile phone through the RF circuit 910, or the audio data is played to the memory 920 for further processing.

WiFi is a short-distance wireless transmission technology. The mobile phone may help a user through the WiFi module 970 to receive and send an electronic mail, browse a webpage, access streaming media and the like, and wireless wideband Internet access is provided for the use. Although the WiFi module 970 is shown in FIG. 9, it can be understood that it is not a necessary composition of the mobile phone and may completely be omitted according to a requirement without changing the scope of the essence of the disclosure.

The processor 980 is a control center of the mobile phone, connects each part of the whole mobile phone by use of various interfaces and lines and executes various functions and data processing of the mobile phone by running or executing the software program and or module stored in the memory 920 and calling data stored in the memory 920, thereby monitoring the whole mobile phone. Optionally, the processor 980 may include one or more processing units. Preferably, the processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 980.

The mobile phone further includes the power supply 990 for supplying power to each part. Preferably, the power supply may be logically connected with the processor 980 through a power management system, thereby realizing functions of charging and discharging management, power consumption management and the like through the power management system.

Although not shown in the figure, the mobile phone may further include a camera, a Bluetooth module and the like, which will not be elaborated herein.

In the embodiments shown in FIG. 2A and FIG. 2B, the flow on a terminal side in each step of the method may be implemented on the basis of the structure of a mobile phone.

In the embodiments shown in FIG. 4 and FIG. 5, each functional unit may be implemented on the basis of the structure or a mobile phone.

An embodiment of the disclosure also provides a computer-readable storage medium, which stores a computer program configured for electronic data exchange, the computer program enabling a computer to execute part or all of the steps executed by the network-side device in, for example, the abovementioned method embodiments.

An embodiment of the disclosure also provides a computer-readable storage medium, which stores a computer program configured for electronic data exchange, the computer program enabling a computer to execute pan or all of the steps executed by the terminal in, for example, the abovementioned method embodiments.

An embodiment of the disclosure also provides a computer program product. The computer program product includes a non-transitory computer-readable storage medium having stored a computer program thereon. The computer program may be operated to enable a computer to execute part or all of the steps executed by the network-side device in, for example, the abovementioned methods. The computer program product may be a software installation package.

An embodiment of the disclosure also provides a computer program product. The computer program product includes a non-transitory computer-readable storage medium having stored a computer program thereon. The computer program may be operated to enable a computer to execute part or all of the steps executed by the terminal in, for example, the abovementioned method embodiments. The computer program product may be a software installation package.

The steps of the method or algorithm described in the embodiments of the disclosure may be implemented in a hardware manner, and may also be implemented in a manner of executing, by a processor, software. A software instruction may consist of a corresponding software module, and the software module may be stored in a Random Access Memory (RAM), a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the specific implementation mode of the embodiments of the disclosure and not intended to limit the scope of protection of the embodiments of the disclosure. Any modifications, equivalent replacements, improvements and the like made on the basis of the technical solutions of the embodiments of the disclosure shall fall within the scope of protection of the embodiments of the disclosure.

The invention claimed is:

1. A method for indicating a channel location, comprising:
sending, by a network-side device, indication information,
wherein the indication information is configured to indicate an offset of a frequency-domain resource of a data channel relative to a frequency-domain starting location of a resource set of a first control channel or a frequency-domain starting location of a search space of the first control channel, and the first control channel is a channel for scheduling the data channel.

2. The method of claim 1, wherein the offset is a resource block or a preset number of resource blocks.

3. The method of claim 1, wherein the indication information is transmitted through Downlink Control Information (DCI).

4. The method of claim 1, further comprising:
sending, by the network-side device, third indication information,
wherein the third indication information is configured to indicate a time-domain length of the data channel, and the third indication information is transmitted through at least one of radio resource control (RRC) signaling or DCI.

5. A method for indicating a channel location, comprising:
receiving, by a terminal, indication information,
wherein the indication information is configured to indicate an offset of a frequency-domain resource of a data channel relative to a frequency-domain starting location of a resource set of a first control channel or a frequency-domain starting location of a search space of the first control channel, and the first control channel is a channel for scheduling the data channel.

6. The method of claim 5, wherein the offset is a resource block or a preset number of resource blocks.

7. The method of claim 5, wherein the indication information is transmitted through Downlink Control Information (DCI).

8. The method of claim 5, further comprising:
receiving, by the terminal, third indication information,
wherein the third indication information is configured to indicate a time-domain length of the data channel, and the third indication information is transmitted through at least one of radio resource control (RRC) signaling or DCI.

9. A terminal, comprising one or more processors, a memory, a communication interface and one or more programs, the one or more programs being stored in the memory and configured to be executed by the one or more processors and the programs comprising instructions configured to execute the step in the method of claim 5.

10. The terminal of claim 9, wherein the offset is a resource block or a preset number of resource blocks.

11. The terminal of claim 9, wherein the indication information is transmitted through Downlink Control Information (DCI).

12. The terminal of claim 9, wherein the communication interface is configured to:
receive third indication information,
wherein the third indication information is configured to indicate a time-domain length of the data channel, and the third indication information is transmitted through at least one of radio resource control (RRC) signaling or DCI.

13. A network-side device, comprising a processor and a transceiver,
wherein the processor is configured to control the transceiver to send indication information,
wherein the indication information is configured to indicate an offset of a frequency-domain resource of a data channel relative to a frequency-domain starting location of a resource set of a first control channel or a frequency-domain starting location of a search space of the first control channel, and the first control channel is a channel for scheduling the data channel.

14. The network-side device of claim 13, wherein the offset is a resource block or a preset number of resource blocks.

15. The network-side device of claim 13, wherein the indication information is transmitted through Downlink Control Information (DCI).

16. The network-side device of claim 13, wherein the processor is further configured to:
control the transceiver to send third indication information,
wherein the third indication information is configured to indicate a time-domain length of the data channel, and the third indication information is transmitted through at least one of radio resource control (RRC) signaling or DCI.

* * * * *